United States Patent
Jackson et al.

[11] Patent Number: 5,915,062
[45] Date of Patent: Jun. 22, 1999

[54] LOW LOSS OPTICAL FIBER REEL

[75] Inventors: Kenneth Wade Jackson, Snellville; Clyde Jefferson Lever, Buford, both of Ga.

[73] Assignee: Lucent Technologies Inc., Murray Hill, N.J.

[21] Appl. No.: 08/886,794

[22] Filed: Jul. 1, 1997

[51] Int. Cl.$^6$ .................................................. G02B 6/36
[52] U.S. Cl. .................... 385/137; 242/571.5; 242/613; 385/147
[58] Field of Search .................... 385/134–137, 385/147; 242/118.4, 571, 571.5, 613, 613.1

[56] References Cited

U.S. PATENT DOCUMENTS

| | | | |
|---|---|---|---|
| 3,920,432 | 11/1975 | Smith ............................................. 65/4 |
| 4,147,407 | 4/1979 | Eichenbaum et al. ............... 350/96.34 |
| 4,657,202 | 4/1987 | Sauber ..................................... 242/117 |
| 4,848,868 | 7/1989 | Rohner ................................. 350/96.23 |
| 4,900,126 | 2/1990 | Jackson et al. ....................... 350/46.23 |
| 5,071,082 | 12/1991 | Lefevre et al. .................. 242/118.4 X |
| 5,119,464 | 6/1992 | Freychet et al. .......................... 385/147 |
| 5,377,292 | 12/1994 | Bartling et al. .......................... 385/128 |
| 5,379,363 | 1/1995 | Bonicel et al. ........................... 385/114 |
| 5,446,821 | 8/1995 | Nonaka et al. .......................... 385/128 |
| 5,485,539 | 1/1996 | Mills ........................................ 385/114 |

FOREIGN PATENT DOCUMENTS 62-237949  9/1987  Japan .
64-103375  4/1989  Japan .

OTHER PUBLICATIONS

Modular Ribbon Design for Increased Packing Density of Fiber Optic Cables, Jackson, et al., International Wire & Cable Symposium Proceedings 1993, pp. 20–27. [No Month].

Primary Examiner—John D. Lee

[57] ABSTRACT

An optical fiber storage reel has a central axis of rotation and a plurality of arcuate surface members extending radially and spaced about the axis of rotation. Each arcuate surface has a radius of curvature that is equal to or greater than the critical bend radius of the optical fiber. The arcuate surfaces are spaced from the axis of rotation a distance such that a cable wound on the reel has a substantially straight line path between the arcuate surfaces, with the sum total of the straight line distances being sufficient to reduce the false loss readings on the cable which can occur when a cable is wound upon a circular drum or hub.

15 Claims, 5 Drawing Sheets

LOW LOSS OPTICAL FIBER REEL

FIELD OF THE INVENTION

This invention relates to the storage of optical fibers and/or optical fiber cables, and, more particularly, to a storage reel upon which such optical fiber members are wound.

BACKGROUND OF THE INVENTION

Optical fiber cable development, wherein the cable is capable of multichannel transmission, has led to a number of different cable configurations, prominent among which are bonded arrays of fibers forming a planar ribbon, and stacks of such ribbons within a core tube or sheath. In a typical ribbon array, a plurality of fibers, e.g., twelve, are held in spaced position parallel to each other by a suitable matrix, a configuration which simplifies construction, installation, and maintenance by eliminating the need for handling individual fibers. Thus, the splicing and connecting of the individual fibers can be accomplished by splicing and connecting the much larger ribbons provided that the fiber positions in the ribbon are precisely fixed and maintained.

In U.S. Pat. No. 4,900,126 of Jackson, et al., there is shown a bonded optical fiber ribbon which typifies, in many respects, the present state of the art for fiber ribbon. The ribbon comprises a plurality of longitudinally extending coated optical fibers disposed in a parallel array. A matrix bonding material fills interstices between adjacent fibers and extends about the array to form substantially flat protective surfaces. The ribbon may contain a large number of fibers such as, for example, sixteen, or it may have more or less, depending upon the particular application.

Cabling of fiber ribbon is usually accomplished by stacking a number of ribbons on top of each other and enclosing them loosely in a tube configuration while imparting a helical twist to the stack such as is shown in "A Modular Ribbon Design for Increased Packing Density of Fiber Optic Cables" by K. W. Jackson, et al., International Wire & Cable Symposium Proceedings 1993, pp. 20–26. In the manufacture of such a loose tube stacked ribbon configuration, the finished cable is wound upon a reel for storage and shipment. Quality control usually dictates that the transmission characteristics of such a cable wound upon a reel be measured for the cable in its reeled or storage condition. It has been found that in a reeled cable configuration, i.e., the fibers in the ribbon stack, exhibit a higher attenuation than does the same cable when laid out in a straight line configuration. Thus, it sometimes happens that a wound or reeled cable is rejected because of too high attenuation, when, in actuality, the cable in use would have an attenuation that was well within acceptable limits. This artificial packaging induced loss becomes greatly exacerbated with higher fiber count cables that are larger in sheath diameter. Such an increase in attenuation is attributable, therefore, to the winding of the cable on a drum, and is not predictable. That is, the increase may, in some instances, be large, while in other cases it is small. Thus, correlation of the attenuation increase with the size of the storage drum and the physical characteristics of the cable is difficult and unreliable. As a consequence, one cannot derive a precise "increased attenuation factor". Short of measuring cable attenuation with the cable in a straight-line configuration, which is totally impractical for the lengths of cable involved, it is desirable that a means be found for minimizing the transient increase in attenuation of fibers in a typical reel configuration.

A similar problem can arises when an optical fiber, buffered fiber, or ribbon, such as dispersion compensating fiber, is wound upon a drum or reel. Such fiber, wound upon a conventional reel, exhibits greater or higher loss than when the fiber is laid out straight. This too is a result of the compressive forces placed on the fiber in wound condition. In dispersion compensating fiber, the fiber usually remains upon the reel in use, hence, an extra component of lose is introduced into the active circuitry.

SUMMARY OF THE INVENTION

The present invention is based upon an analysis of the increased attenuation phenomenon for wound or reeled cable and will be discussed in greater detail hereinafter. The analysis reveals that when a stacked ribbon cable, for example, is wound upon a drum or reel under tension, which is necessary for a proper winding, an added component of loss, i.e., attenuation, is induced by the twisting and bending of the ribbon stack during winding which causes the stack to be pulled toward the center of curvature of the cable sheath and the drum, and which can generate microbending forces as a result of the compressive forces between the inner wall of the cable core tube and the fibers near the corners of the ribbon stack. It has been found that the degree of compressive force that produces microbending losses is inversely related to the radius of the drum upon which the cable is wound and the number of microbends included in the fiber is directly related to the contact length of the ribbon along the core tube. Thus, a reel having a large diameter drum will introduce less compressive force, hence, less microbending loss, than a drum of lesser diameter. However, there are physical limits to the sizes of storage reels and, hence, drums.

The invention is a cable reel configuration that permits a substantial portion of the wound cable to be in a straight line configuration. In a first preferred embodiment of the invention, the cylindrical, i.e., circular, drum of the standard or normal storage reel is replaced by a plurality of transversely extending cylindrical lobes, preferably symmetrically disposed about the centerline of the reel. The radius (or diameter) of each of the cylindrical lobes is such that the cable, or fiber, wound thereon is not subjected to that critical bending which introduces not only large amounts of loss but also can cause physical damage, such as microcracks, to the optical fiber. Thus, as used hereinafter, "critical bend radius" is that radius of curvature that is the minimum allowable without incurring losses or microcracks in the cable as a result of such bending. The lobes are preferably spaced from each other so that a fiber or cable wound thereon has a straight section between each pair of lobes, and the greater the cumulative amount of straight cable or fiber, the greater the reduction in the induced loss therein when wound upon the lobes. The number of lobes can be two, three, four or more, depending upon other factors, but best results are thus far obtained when the cumulative amount of straight cable exceeds as much as possible the cumulative amount of curved cable. For this result, it has been found that three or four lobes are best.

The principles of the invention are applicable to storage or holding reels of smaller size than the storage drums, such reels being used with dispersion compensating fibers which remain on the reel in use, and to virtually all cable configurations, such as, for example, slotted core on loose tube designs.

The principles and features of the invention will be more readily understood from the following detailed description, read in conjunction with the accompanying drawings.

DETAILED DESCRIPTION

Figure 1:
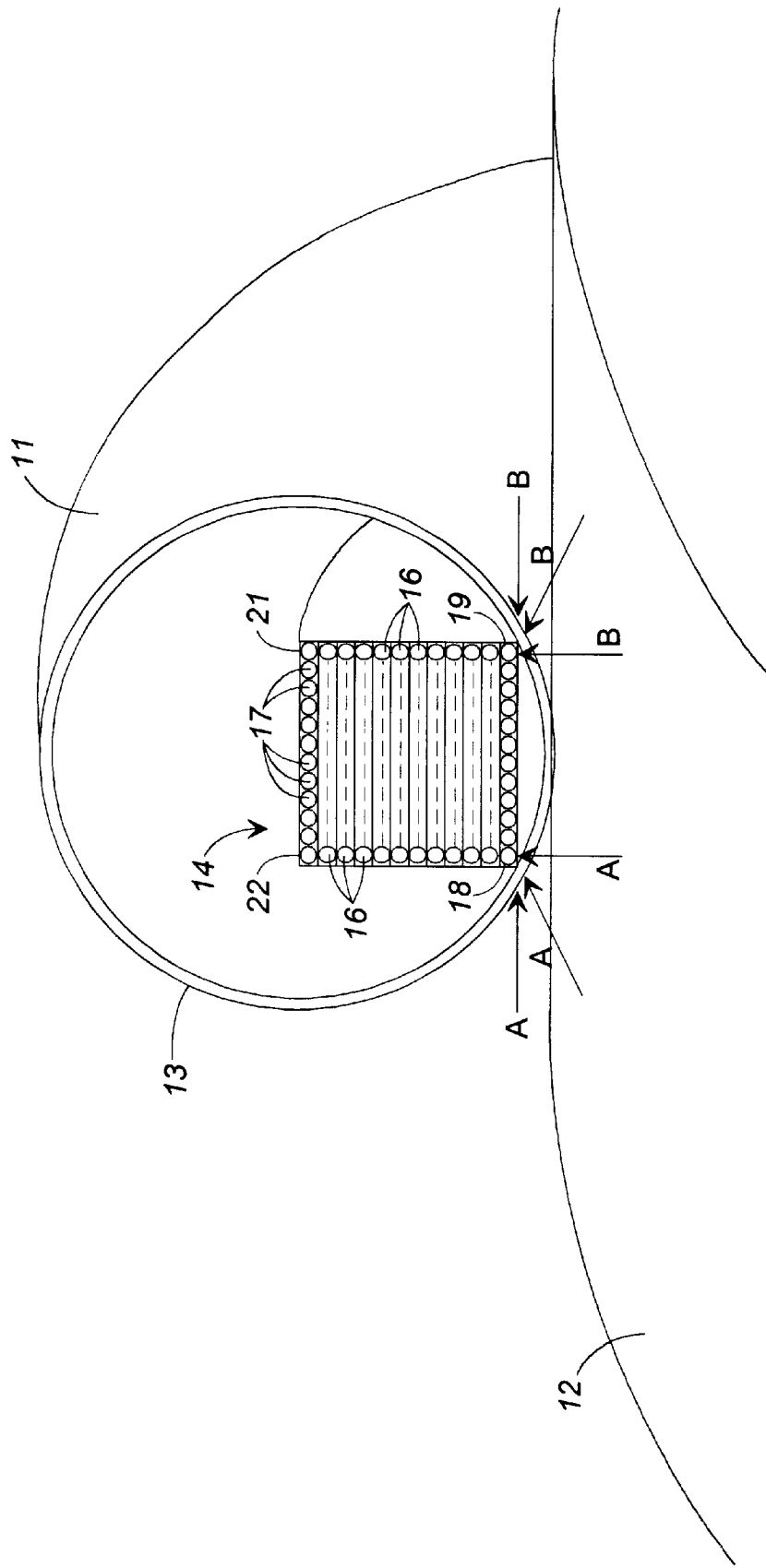
FIG. 1 is a diagrammatic elevation view of the loose tube stacked ribbon cable wound upon a convention drum.

In FIG. 1 there is a diagrammatic elevation view of a single loose tube cable 11 as wound upon a large diameter drum 12. It is to be understood that the size of cable 11 relative to drum 12 is somewhat exaggerated for better illustrating the effects upon the cable 11 of its being wound on drum 12. Cable 11 comprises a loose core tube 13 of suitable material, usually a flexible plastic tube, having within it a stack 14 of optical fiber ribbons 16 each containing a parallel array of individual fibers 17 which may vary in number. In FIG. 1 each ribbon 16 comprises twelve individual fiber 17, although it is to be understood that a ribbon may comprise many more individual fibers, or fewer fibers, depending upon the particular application for which the cable is intended. As was discussed hereinbefore, the stack 14 of ribbon 16 has a helical twist which extends longitudinally that was imparted during the cabling process. In FIG. 1, only the core tube of the cable is shown. It is to be understood that there usually are other components of the cable, such as strength members and outer protective sheaths, for example, which, for clarity, have not been shown.

When the cable 11 is wound upon the drum 12, it is usually under tension and, during the winding process, the stack 14 is pulled toward the center of curvature of the drum 12 and compressive forces, as indicated by the arrows A and B are generated against the corner fibers, which are designed 18, 19, 21, and 22. As a result of the twist imparted to the cable during the cable assembly, each of these corner fibers in turn is subjected to these compressive forces, and, after an entire length of cable is wound upon the drum, each of the corner fibers 18, 19, 21, and 22 is under compression periodically along the entire length of the cable. If the surfaces of core tube 13 and the ribbon are not perfectly smooth, which they usually are not, the compressive forces between the corner fibers and the core tube surface induce microbending losses in the fibers. The degree of compressive force that produces microbending loss is inversely proportional to the radius (or diameter) of the drum 12. Obviously, therefore, the larger the diameter of the drum, the less likelihood of microbending losses. However, as a practical matter, a desirably large diameter drum can make the storage reel far too large for handling and storage.

In a drum 12 of practical size, the losses induced in the fiber are of sufficient magnitude to impart a false apparently increased loss characteristic to the fiber that is greater, i.e., less desirable, than is actually the case. Such an erroneous reading can make the cable appear inadequate for particular applications, and, in the past, cable has been inadvertently scrapped as a result.

Figure 2:
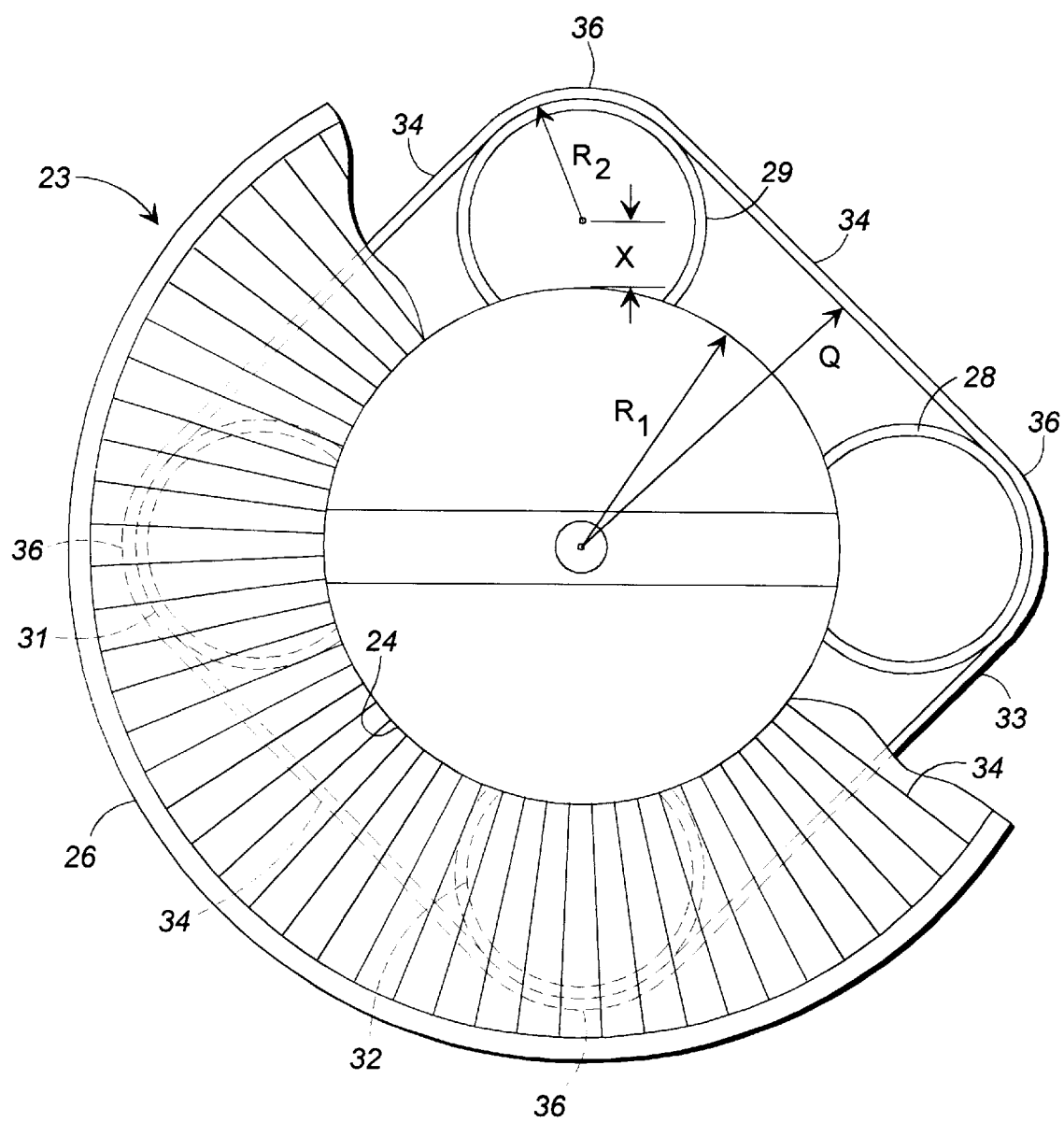
FIG. 2 is an elevation view of a first embodiment of the invention.

In FIG. 2 there is shown an elevation view partially cut away to illustrate the basic arrangement of the invention, which is a storage drum 23 which, in accordance with the features of the invention, materially reduces the measurable loss characteristics of the invention. Drum 23 comprises a circular hub member 24 having flanges 26 and 27 (only one of which is shown. Hub 24 has a radius $R_1$ which may be the radius of a standard storage drum, or which may be somewhat less, measured from the axis of the hub or of the drum. Affixed, as by welding, to the surface of hub 24, preferably at ninety degree (90°) intervals are four circular lobes 28, 29, 31, and 32 which are preferably hollow, and which have a radius $R_2$, as shown. As was pointed out hereinbefore, radius $R_2$ is greater than the critical bend radius for the fibers being wound and stored on drum 23. The lobes 29, 29, 31 and 32 are preferably made of the same material as hub 24, such as aluminum or other suitable material. Obviously, where that material is non-weldable or brazeable, such as wood, other means such as, for example, screws, must be used to affix the lobes to the hub 24.

It can be seen from FIG. 2 that when a cable 33 (the ends of which are not shown) is wound upon the drum 23 of FIG. 2 there exists, between the lobes 28, 29, 31 and 32, straight sections 34 of cable which greatly exceed, in length, the curved sections 36 thereof, which occur at the lobes. In this way, a major portion of the cable 33 stored on the drum 23 is straight, and erroneous loss measurements are materially reduced. The placement of the lobes 28, 29, 31 and 32, is such that their center of curvature is spaced from the surface of hub 24 a distance X so that the cable is spaced from the central axis of hub 24 a distance Q, which is greater than the hub radius $R_1$. It is, of course, possible for the distance X to be zero if $R_2$ is sufficiently large to maintain the relationship $Q > R_1$. It can be readily appreciated that if X plus $R_2$ is insufficient, the cable 33 will bear against the surface of hub 24 which will, in turn, impart a curvature to the cable, thereby defeating the purpose of the invention. Thus, in accordance with the invention X plus $R_1 + R_2$ should be great enough to maintain a finite value for Q minus $R_1$. The straight lengths 34 of the cable 33 are tangent to the lobes, as shown. Thus, the tangent to any two adjacent or successive lobes and extending therebetween defines a straight line unimpeded path between the lobes, as can be clearly seen in FIG. 2 and other, subsequent figures. The straight sections 34 make it possible for the cable to re-align itself to reduce the pressure, indicated in FIG. 1, at the curved portion 36. An arrangement as shown in FIG. 2 has yielded excellent results, resulting in a material decreases in scrapped cable as a result of false loss readings thereon.

Figure 3:
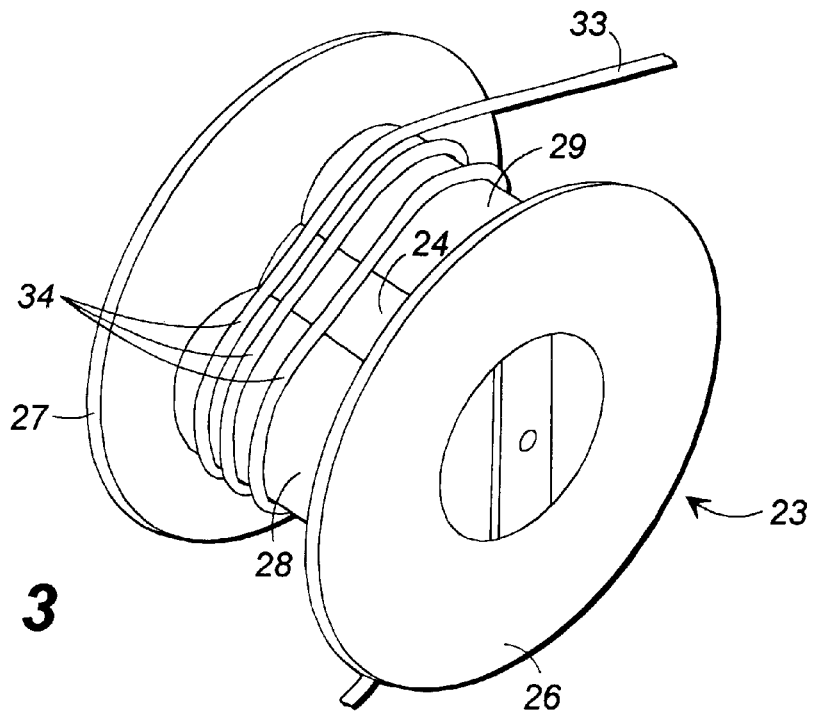
FIG. 3 is a perspective view of an alternative embodiment of the invention.

The arrangement of FIG. 2 is depicted as having four lobes 28, 29, 31 and 32. It is also possible that fewer or more lobes may be used, so long as the restrictions discussed in the foregoing are observed. In FIG. 3 there is shown a storage drum 23 (for simplicity, like numerals designate like components in the several views) which has three equally spaced lobes 28, 29, and 31 (not shown) around the circumference of hub 24. It should be borne in mind that if the diameters (or radii) of the lobes are too large, the amount of curved cable will be increased, possibly producing an undesirable false loss reading. On the other hand, the radius $R_2$ of the lobes should be greater than the critical bend radius of the cable. As a consequence, the dimension X shown in FIG. 2 becomes important, especially for a number of lobes less than four. The distance X makes it possible to build out the lobes sufficiently to insure that $Q>R_1$.

Figure 4:
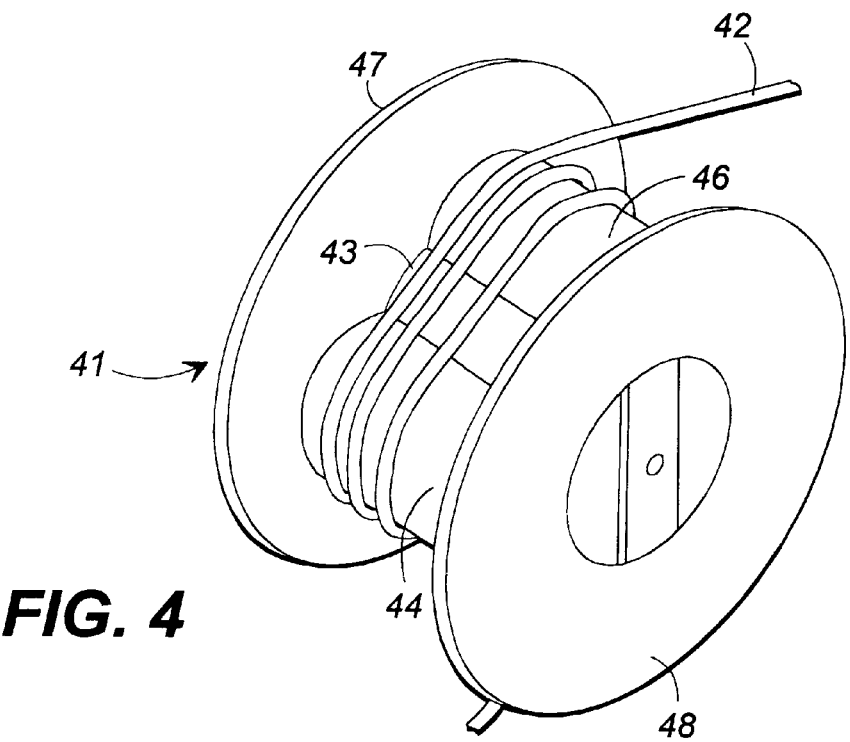
FIG. 4 is a perspective view of an optical fiber wound upon a reel embodying the principles of the invention.

In FIG. 4 there is shown a reel 41 for storing an optical fiber 42 wound thereon. Reel 41 is generally considerably smaller than a storage drum, but has a configuration substantially the same as the drum of FIG. 2 or 3. Shown in FIG. 4 are first and second lobes 44 and 46 affixed to hub 43 with either one or two lobes, not shown, also affixed to hub 43, with the lobes being equally spaced circumferentially around hub 43. As with the arrangement of FIGS. 2 and 3, the hub 43 and lobes 44 and 46 are enclosed by flanges 47 and 48. It has been found that when a single fiber 42 is wound upon a circular hub where there are no straight sections, the tension on the fiber and any irregularities of the hub surface produces continuous microbending and consequent losses. It is desirable, therefore, to apply the principles of the invention to a reel for holding a single fiber (although more than one fiber or a ribbon can also be wound on the reel) to reduce false loss reading.

Thus far the discussion has dealt with what amount to modifications of a standard storage reel or drum, i.e., one having a hub member of radius $R_1$. It is equally possible to apply the principles of the invention to other types of configurations, as shown in FIGS. 5A and 5B.

Figure 5A:
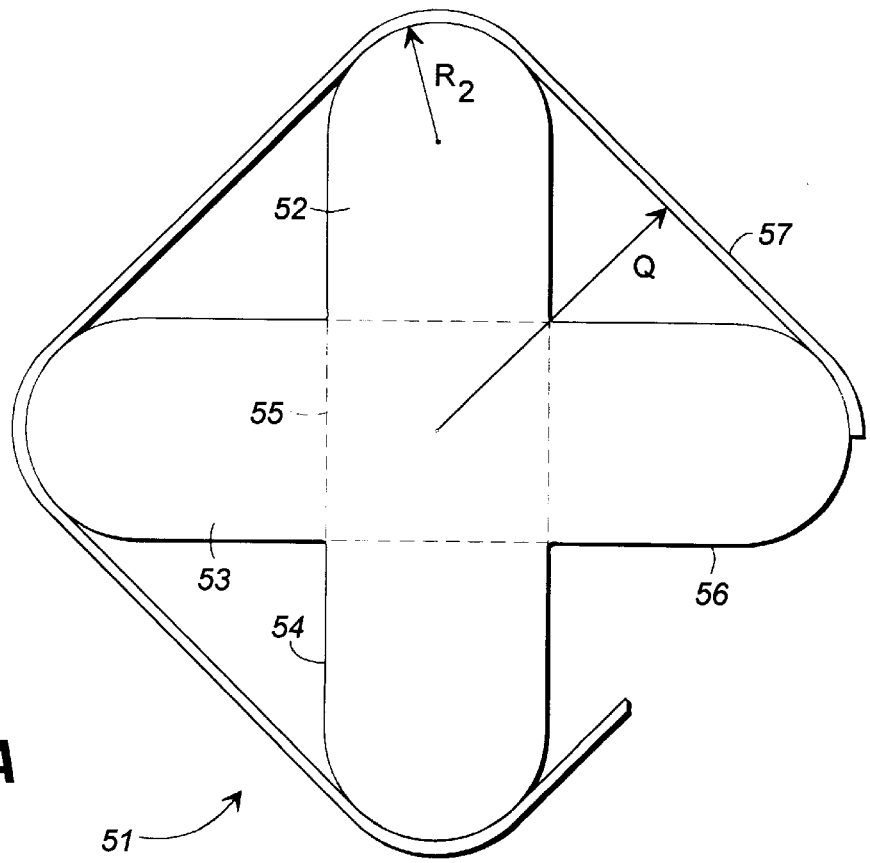
FIGS. 5A and 5B are plan views of alternative reel configurations embodying the principles of the invention.
Figure 5B:
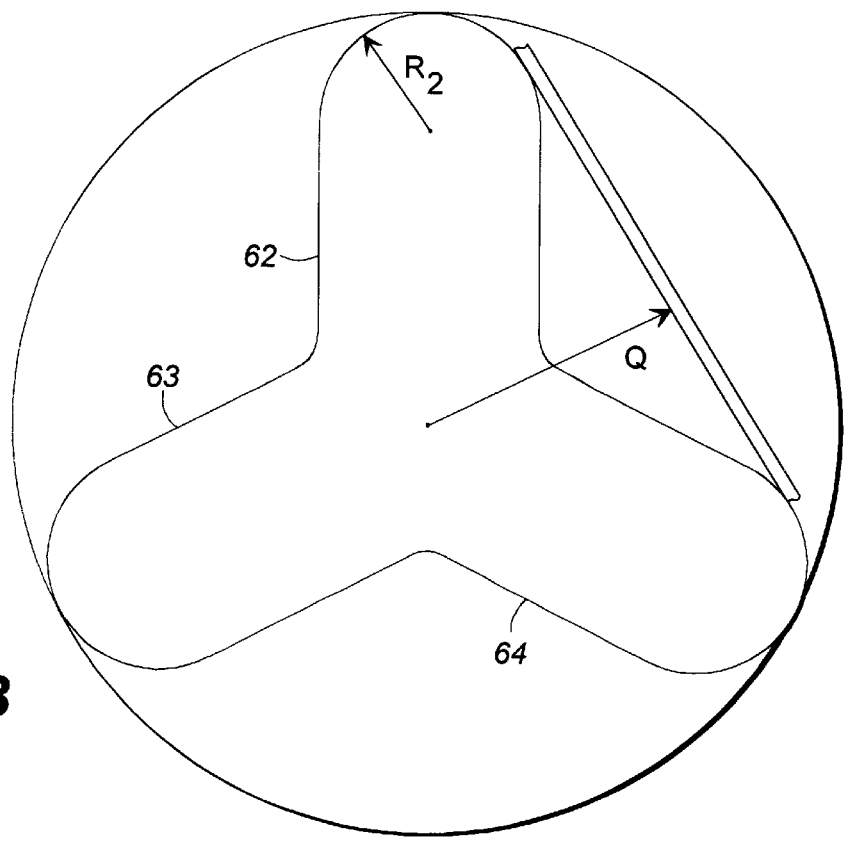

The drum or reel 51 of FIG. 5A eliminates, or at least minimizes, the hub of the reel, instead having four elongated lobes 52, 53, 54 and 56 oriented at approximately ninety degrees (90°) from each other, and which, for weight considerations, are preferably hollow. The distal ends of the lobes are curved at the radius $R_2$ which is equal to or exceeds the critical bend radius of the fiber, as was discussed hereinbefore. It can be seen that the fibers 57 wound upon the reel 51 is separated by the distance Q from the axis of the reel 51, affording fiber or cable 57 a clear straight line path between lobes. The arrangement of FIG. 5B is substantially the same as that of FIG. 5A, except the three lobes 62, 63, and 64 are preferably separated from each other by one hundred twenty degrees (120°). Instead of a hub member, the region 55 formed where the lobes are joined together forms a hollow axial strength member of square cross-section is shown by the dashed lines. This region can have any desired shape, such as triangular (for the arrangement of FIG. 5B), circular, or otherwise.

Figure 6A:
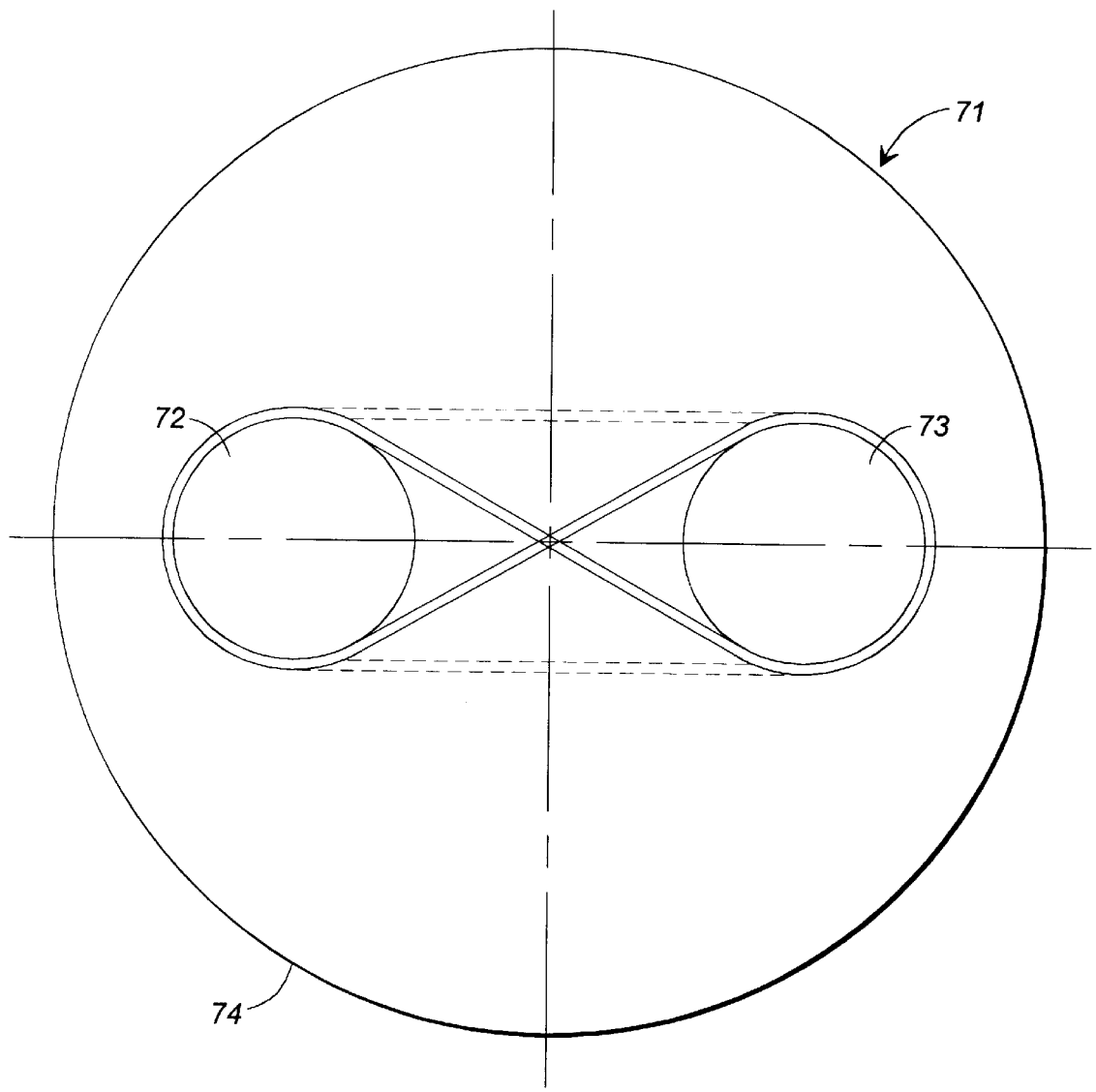
FIGS. 6A and 6B are plan and elevation views, respectively, of another alternative reel configuration.
Figure 6B:
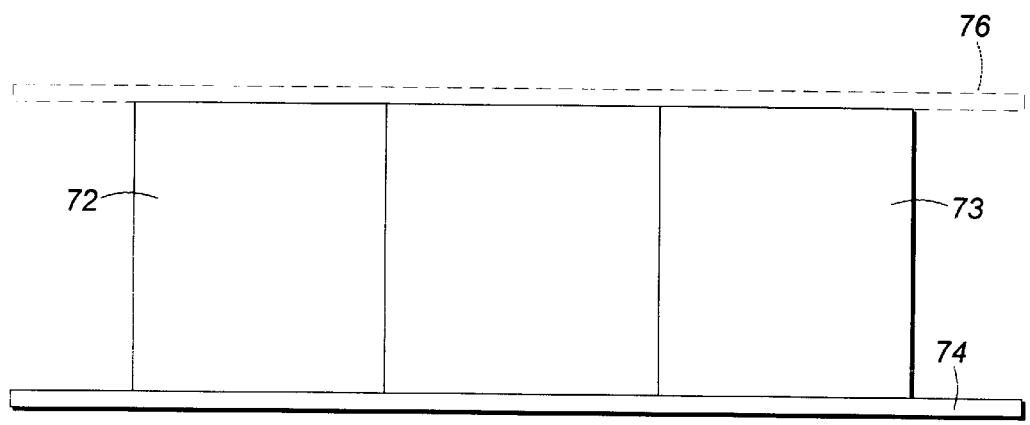

FIG. 6A is a plan view of an alternative reel configuration 71 embodying the principles of the invention which is especially adapted to permit cable winding in a FIG. 8 mode. The arrangement 71 of FIG. 6A comprises first and second circular cylinders 72 and 73, each having a radius of curvature $R_2$ greater than the critical bend radius of the optical fiber, and spaced from the central axis of the reel which has a flange 74. With such a structure, optical fiber cable, for example, can be wound on the two cylinders 72 and 73 in a FIG. 8 configuration, as shown in FIG. 6A, or in a straight line winding, as shown by the dashed lines. FIG. 6B is a plan view of the arrangement of FIG. 6A illustrating how the second reel flange 76, shown in dashed lines, can be placed after winding. If FIG. 8 winding is not used, flange 76 may be placed and affixed by suitable means to the cylinders 72 and 73 prior to winding.

It can be seen that the wound cable (or fiber) is in contact with cylinders 72 and 73 only over a short portion of its length, the remaining portion being straight and non-contacting with the reel 71. Such a configuration, in common with the other embodiments of the invention, materially reduces the artificial packaging loss occurring with prior art reels.

In all of the embodiments thus far described, the arcuate surfaces are equidistance from the axis of rotation or central axis of the reel. It is conceivable that workers in the art might deem this constraint unnecessary, so long as the other constraints set forth herein are observed. While the principles of the invention have been disclosed as they relate to cables having a ribbon stack loosely disposed in a tubular sheath, these principles are applicable to virtually any cable configuration for winding on a reel.

The foregoing description and the accompanying drawings have been and are for purposes of illustrating, in preferred embodiments, the principles and features of the present invention. It should be noted that it will be obvious to those skilled in the art that many variations and modifications may be made to the embodiment herein depicted without substantial departure from the principles of the present invention. It is intended that all such variations and modifications be included herein as being within the scope of the present invention. Further, in the claims hereinafter set forth, the corresponding structures, materials, acts, and equivalents thereof and of all means or step-plus-function elements are intended to include any structure, materials, or acts for performing the functions with other elements as specifically claimed.

We claim:

1. A reel for containing optical fibers wound thereon, said reel comprising:
   a plurality of arcuate surface members affixed to said reel and having a radius of curvature $R_2$ approximately equally spaced about a central axis of the reel and extending radially therefrom;
   the radius of curvature $R_2$ of each of said surface members being at least equal to the critical bend radius for the fiber to be wound upon the reel;
   the arcuate surfaces of each of said arcuate surface members being spaced from the central axis a distance such that a tangent to any two successive arcuate surfaces and extending therebetween defines a straight line, unimpeded path for an optical fiber wound upon said reel.

2. A reel as claimed in claim 1 wherein there are four arcuate surface members spaced at ninety degree (90°) intervals about the central axis.

3. A reel as claimed in claim 1 wherein there are three arcuate surface members spaced at one hundred twenty degree (120°) intervals about the central axis.

4. A reel as claimed in claim 1 wherein the distance of said arcuate surfaces from the central axis and the spacing of said arcuate surface members is such that the cumulative total length of the straight line paths tangential to successive arcuate surfaces exceeds the total length of the arcuate surfaces which are adapted to have the fiber bear against them.

5. A reel as claimed in claim 1 wherein each of said arcuate surface members is an elongated lobe extending radially from the center of said reel.

6. A reel as claimed in claim 5 wherein said elongated lobes form a cruciform configuration.

7. A reel as claimed in claim 5 wherein said elongated lobes form a trefoil configuration.

8. A reel as claimed in claim 1 wherein said arcuate surface members are formed by a first cylindrical member located on a first side of the central axis and spaced therefrom and substantially parallel thereto and a second cylindrical member on a second side of the central axis and spaced therefrom and substantially parallel thereto.

9. A reel for containing optical fibers wound thereon, the reel having a central axis of rotation, said reel comprising:
- a central hub member having a curved surface with a radius of curvature $R_1$ about the central axis;
- a plurality of lobes integral with said hub member and extending radially therefrom, said lobes being spaced from each other about the circumference of said hub member;
- each of said lobes having a radius of curvature $R_2$ at least equal to the critical bend radius of the fiber to be wound thereon to form an arcuate surface against which the fiber bears when wound upon the reel, the tangent to adjacent arcuate surfaces and extending therebetween forming straight unimpeded paths between adjacent lobes;
- said straight unimpeded paths being spaced from the central axis of rotation a minimum distance Q where $Q>R_1$.

10. A reel as claimed in claim 9 wherein the locus of the radius of each of said lobes is spaced from the surface of said hub a distance X such that the arcuate surface of each of said lobes is a distance from the axis of rotation of said reel equal to $R_1+X+R_2$.

11. A reel as claimed in claim 10 where X is equal to zero.

12. A reel as claimed in claim 10 wherein said central hub member has first and second ends, and further comprising a flange member at each of said ends of said hub member.

13. A reel as claimed in claim 12 wherein said flange members have a diameter greater than two times the distance $R_1+X+R_2$.

14. A reel as claimed in claim 9 wherein there are four lobes extending radially from said hub member, said lobes being spaced ninety degrees (90°) from adjacent lobes around the circumference of said hub member.

15. A reel as claimed in claim 9 wherein there are three lobes extending radially from said hub member, said lobes being spaced one hundred and twenty degrees (120°) from adjacent lobes around the circumference of said hub member.

* * * * *